(12) United States Patent
Deljosevic et al.

(10) Patent No.: US 10,829,101 B2
(45) Date of Patent: Nov. 10, 2020

(54) REDUNDANT INTEGRATED PARKING BRAKE RELEASE CIRCUIT

(71) Applicant: Continental Automotive Systems, Inc., Auburn Hills, MI (US)

(72) Inventors: Marjan Deljosevic, Shelby Township, MI (US); Ermal Gjoni, Sterling Heights, MI (US); John Truax, Washington Township, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 26 days.

(21) Appl. No.: 16/177,823

(22) Filed: Nov. 1, 2018

(65) Prior Publication Data

US 2019/0193707 A1 Jun. 27, 2019

Related U.S. Application Data

(60) Provisional application No. 62/581,473, filed on Nov. 3, 2017.

(51) Int. Cl.
*B60T 13/74* (2006.01)
*B60T 7/10* (2006.01)
(Continued)

(52) U.S. Cl.
CPC ............ *B60T 13/746* (2013.01); *B60T 7/045* (2013.01); *B60T 7/104* (2013.01); *B60T 7/105* (2013.01); *B60T 7/107* (2013.01); *B60T 7/12* (2013.01); *B60T 8/1881* (2013.01); *B60T 13/66* (2013.01); *B60T 13/662* (2013.01); *B60T 13/74* (2013.01); *B60T 13/741* (2013.01); *B60T 13/743* (2013.01); *B60T 17/221* (2013.01); *B61H 1/00* (2013.01); *F16D 65/14* (2013.01); *H02P 1/00* (2013.01); *H02P 1/22* (2013.01); *H02P 3/16* (2013.01); *B60T 2270/402* (2013.01); *B60T 2270/413* (2013.01); *B60T 2270/414* (2013.01);
(Continued)

(58) Field of Classification Search
CPC ......... B60T 13/385; B60T 13/741–746; B60T 13/662; B60T 13/683; B60T 13/686
USPC ..................... 188/2 D, 156–164; 303/15, 20; 701/70–72
See application file for complete search history.

(56) References Cited

U.S. PATENT DOCUMENTS 9,428,159 B2 * 8/2016 Heise ...................... B60T 7/042
2004/0201270 A1 * 10/2004 Suzuki .................. B60T 13/741
303/20
(Continued)

FOREIGN PATENT DOCUMENTS

DE 19962556 A1 7/2001
DE 102011084534 A1 4/2012
(Continued)

OTHER PUBLICATIONS

International Search Report and Written Opinion dated Jan. 25, 2019 from corresponding International Patent Application No. PCT/US2018/059030.

*Primary Examiner* — Christopher P Schwartz

(57) ABSTRACT

An electric motor-driven parking brake of a motor vehicle can be released in an emergency by applying emergency current from a parallel emergency current source to the motors controlling the parking brake. The direction of the emergency current is selected to reverse the motors, i.e., release the parking brake.

15 Claims, 2 Drawing Sheets

(51) Int. Cl.
*B60T 7/04* (2006.01)
*H02P 1/22* (2006.01)
*B60T 17/22* (2006.01)
*B60T 8/18* (2006.01)
*B60T 13/66* (2006.01)
*B61H 1/00* (2006.01)
*H02P 1/00* (2006.01)
*B60T 7/12* (2006.01)
*F16D 65/14* (2006.01)
*H02P 3/16* (2006.01)
*F16D 121/24* (2012.01)
*F16D 127/02* (2012.01)
*F16D 129/06* (2012.01)

(52) U.S. Cl.
CPC ...... *F16D 2121/24* (2013.01); *F16D 2127/02* (2013.01); *F16D 2129/06* (2013.01)

(56) References Cited

U.S. PATENT DOCUMENTS

| | | | |
|---|---|---|---|
| 2008/0197696 A1* | 8/2008 | Degoul | B60T 7/042 303/115.4 |
| 2009/0200124 A1* | 8/2009 | Heise | B60T 7/042 188/162 |
| 2011/0264346 A1* | 10/2011 | Kinder | B60T 7/122 701/70 |
| 2015/0251639 A1 | 9/2015 | Peter et al. | |
| 2017/0108067 A1 | 4/2017 | Masuda et al. | |

FOREIGN PATENT DOCUMENTS

| | | |
|---|---|---|
| DE | 102011086756 A1 | 5/2012 |
| DE | 102015110968 A1 | 1/2016 |
| DE | 102015114176 B3 | 7/2016 |
| EP | 1686029 A1 | 8/2006 |
| WO | 2005110814 A1 | 3/2008 |

\* cited by examiner

REDUNDANT INTEGRATED PARKING BRAKE RELEASE CIRCUIT

CROSS REFERENCE TO RELATED APPLICATION

This application claims priority to U.S. Provisional Application No. 62/581,473 filed on Nov. 3, 2017.

BACKGROUND

A motor vehicle's parking brake is used to keep a vehicle stationary and in some cases perform an emergency stop. They are typically embodied as either a pedal or handle, which when depressed or lifted respectively, pulls a cable that applies force to one or two wheel brakes of a vehicle causing them to engage and hold the vehicle stationary.

Some vehicles are now provided with electronic brakes or "e-brakes," also known as integrated parking brakes. They replace a simple and reliable prior-art parking brake with a complex system of electric motors and motor controllers.

Activation of a parking brake in vehicles with integrated parking brakes or "e-brakes" is accomplished using a push button on a vehicle's dashboard or elsewhere, sending a signal to an electronic device which actuates electric motors to engage the brakes. Releasing the brakes in an e-brake vehicle requires another push button actuation. Unfortunately, when electronic devices fail, as they are known to do, the parking brakes in an e-brake equipped vehicle cannot be released. And, since the electric motor-operated brakes typically apply a much greater brake actuating force, an e-brake will usually lock the wheels solidly. An apparatus for releasing the mechanical brakes in a vehicle provided with an e-brake system or "integrated parking brake" system would be an improvement over the prior art.

SUMMARY

An apparatus for releasing an electric motor-driven parking brake of a motor vehicle, the electric motor-driven parking brake including a mechanical parking brake, which is applied and released by controlling the operation and direction of an electric motor that is mechanically coupled to the mechanical parking brake, the electric motor being normally driven by a first electrical energy source, the apparatus according to an exemplary embodiment of this disclosure, among other possible things includes a processor configured to receive a parking brake power supply failure signal, which when received, it indicates to the processor that the first electrical energy source is unable to provide electrical energy to the electric motor and an electronically controlled, normally-open switch connected between a second electrical energy source and the electric motor, the normally-open switch being operatively coupled to the processor and capable of closing and opening responsive to a control signal from the processor. The processor configured to send a parking brake release control signal to the electronically controlled, normally-open switch upon the processor's receipt of the parking brake power supply failure signal, the parking brake release control signal causing the electronically controlled, normally-open switch to close and thereby provide electrical energy to the motor.

In a further embodiment of the foregoing apparatus, the normally-open switch comprises a transistor and wherein the second electrical energy source is a battery.

In a further embodiment of any of the foregoing apparatuses the processor, the motor, the electronically controlled, normally-open switch and the second electrical energy source are selected and arranged to provide electrical energy to the electric motor that will cause the electric motor to rotate in only one direction when the electric motor receives electrical energy from the second power source, the one direction causing the parking brake to release.

In a further embodiment of any of the foregoing apparatuses, including an integrated parking brake controller includes an output connected to the electric motor, the output of the integrated parking brake controller provides first and second output voltages, which cause the motor to apply and release the parking brake respectively.

In a further embodiment of any of the foregoing apparatuses, including first and second timers connected in series, the first and second timers enabling and disabling the actuation of the electronically controlled, normally-open switch, wherein the first timer is started when the motor vehicle ignition is turned on and runs until the expiration of a predetermined amount of time the expiration of which is followed by a signal being sent to the second timer to begin a wait time for reset signal.

In a further embodiment of any of the foregoing apparatuses, an output from the first timer goes active to cause the motor to turn on and release the parking brake in response to failure to receive the reset signal.

An electric motor-driven parking brake system for a motor vehicle according to another exemplary embodiment of this disclosure, among other possible things includes mechanical parking brake coupled to an electric motor, wherein the mechanical parking brake is applied and released by controlling operation and direction of the electric motor, an electric energy source driving operation of the electric motor and a controller controlling operation of the electric motor to release the parking brake. The controller including, a processor configured to receive a parking brake power supply failure signal, which when received, it indicates to the processor that the first electrical energy source is unable to provide electrical energy to the electric motor, an electronically controlled, normally-open switch connected between a second electrical energy source and the electric motor, the normally-open switch being operatively coupled to the processor and capable of closing and opening responsive to a control signal from the processor, wherein, the processor is configured to send a parking brake release control signal to the electronically controlled, normally-open switch upon the processor's receipt of the parking brake power supply failure signal, the parking brake release control signal causing the electronically controlled, normally-open switch to close and thereby provide electrical energy to the motor.

In a further embodiment of the foregoing electric motor-driven parking brake system the electronically controlled, normally-open switch comprises a transistor and the second electrical energy source is a battery.

In a further embodiment of any of the foregoing electric motor-driven parking brake systems, the processor, the motor, the electronically controlled, normally-open switch and the second electrical energy source are selected and arranged to provide electrical energy to the electric motor that will cause the electric motor to rotate in only one direction when the electric motor receives electrical energy from the second power source, the one direction causing the parking brake to release.

In a further embodiment of any of the foregoing electric motor-driven parking brake systems, an integrated parking brake controller includes an output connected to the electric motor, the output of the integrated parking brake controller provides first and second output voltages, which cause the motor to apply and release the parking brake respectively In a further embodiment of any of the foregoing electric motor-driven parking brake systems, first and second timers are connected in series, the first and second timers enabling and disabling the actuation of the electronically controlled, normally-open switch, wherein the first timer is started when the motor vehicle ignition is turned on and runs until the expiration of a predetermined amount of time the expiration of which is followed by a signal being sent to the second timer to begin a wait time for reset signal.

In a further embodiment of any of the foregoing electric motor-driven parking brake systems, an output from the first timer goes active to cause the motor to turn on and release the parking brake in response to failure to receive the reset signal.

A method of controlling an electric motor-driven parking brake system for a motor vehicle according to another example embodiment includes, among other possible things, starting a timer in response to an action demonstrating an intention to move the motor vehicle, determining an operational state of an engine control unit, determining an operational state of an electric motor coupled to a parking brake, determining if the parking brake requires release and providing a current to operate the electric motor to release the parking brake.

In a further embodiment of the foregoing method, the action demonstrating an intention to move the motor vehicle comprises actuation of an ignition of the motor vehicle.

In a further embodiment of any of the forgoing methods, the electric motor is powered through a release circuit responsive to the timer expiring without receiving an indication that the parking brake has been released.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
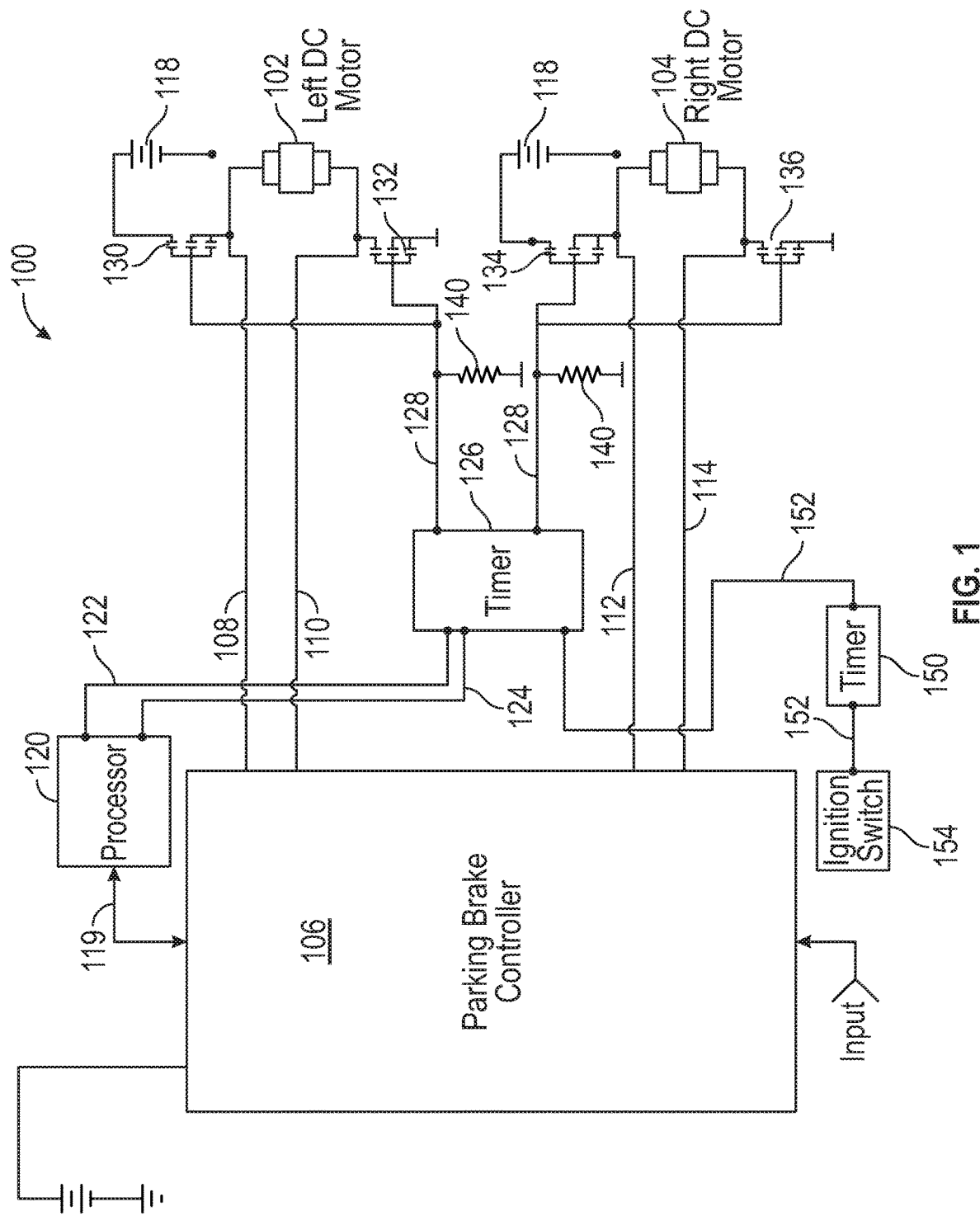
FIG. 1 is a block diagram of an apparatus for releasing an electric motor-driven parking brake in an integrated parking brake-equipped vehicle, when the integrated parking brake electronics fail.

FIG. 1 depicts an apparatus 100 for releasing one or both electric motors of an electric motor-driven parking brake system in a motor vehicle equipped with a so-called integrated parking brake or "IPB" system. An electric motor-driven parking brake comprises of course, two reversible motors 102, 104, the output shafts of which are omitted from FIG. 1. When the motors 102, 104 rotate in a first direction, either clockwise or counter clockwise as a design choice, they exert tension on a parking brake cable. Reversing the motors 102, 104 releases tension on the cable which releases the parking brake or unwinds a gear to release the brake, depending on the parking brake design.

An integrated parking brake controller 106 provides electric driving current to the motors 102, 104 through corresponding drive wires 108, 110 and 112, 114. When the motors 102, 104 are to be driven in a first direction, the electric current provided to the motors on the drive wires travels in a first direction. When the motors need to be reversed, the polarity of the current is reversed. Unfortunately, when the integrated brake controller 106 fails, one or both motors can be rendered inoperative.

In the disclosed embodiment, the apparatus for releasing an electric motor-driven parking brake in a motor vehicle comprises a processor 120 operatively coupled to the integrated parking brake controller 106 through a control wire or control "line" 119. Put simply, when the integrated parking brake controller 106 fails, a fail signal is provided to the processor 102 through the control line 119, which indicates to the processor 102 that the integrated parking brake controller 106 has failed and unlikely or unable to provide electrical energy to the electric motors 102 and 104.

When the integrated parking brake controller 106 fails, the processor 120 is configured to provide a "backup" parking brake release current to one or both motors 102, 104 through switches embodied as field effect transistors (FET), the polarity or direction of the parking brake release current being selected in advance such that the motors will only reverse, i.e. the motors will only release the parking brake, when the FETs "close" or are driven to their conducting states.

The FETs are considered to be electronically controlled, normally-open switches, which are connected between the motors 102, 104 and a current source such that when the switches "close," they provide battery power 118 to the motors 102, 104. The battery power 118 causes the motors to release the parking brake.

In a disclosed embodiment, the electronically controlled, normally-open switches are embodied as field effect transistors connected in parallel to the current supply lines 108, 110 and 112, 114 that extend from the integrated parking brake controller 106 to the motors armatures. A first NMOS transistor 130 has its drain terminal connected to the battery and its source terminal connected to the armature of the first motor 102. The gate is operatively coupled to the processor 120 through a timer 126, the function of which will be explained later.

A second NMOS transistor 132 has its drain connected to the opposite armature of the first motor 102 and its source connected to ground. Its gate is also coupled to the processor 120 through the aforementioned timer 126. When a control signal 128 goes "active" or "high" both NMOS transistors turn "on" applying the battery voltage 118 to one armature and ground to the second armature, the result of which is energizing the motor 102.

In an alternate embodiment, PMOS transistors are used. Unlike an NMOS transistor, the PMOS transistors conduct when their gate voltages go "low." The polarity of the control signal 128 should therefore go "low" or inactive to turn the motors on.

In FIG. 1, emergency power is provided to the other motor 104 in the same way. Two NMOS transistors 134 and 136 apply battery voltage and ground to the armatures of the second motor 104. Turning those transistors on thus enables the second motor to also become energized.

The control signals 128 are provided to the NMOS transistors only after a first timer 126 has determined that a pre-determined amount of time has elapsed after the vehicle's ignition indicates that the vehicle is starting. That pre-determined wait or delay time that the apparatus 100 waits is determined by a second timer 150, which receives an ignition signal 152 from an ignition actuation switch 154.

Stated another way, when the ignition switch 154 shows that the vehicle is being started, an ignition signal 152 is provided to the timer 150. At the expiration of the timer 150, a signal 152 is sent to the first timer 126 triggering it to begin a wait time for a signal from the processor 120 to reset. If the reset signals 122 and 124 are not received within the pre-determined time after the trigger signal 152 is received by the first timer 126, the outputs 128 of the first timer 126 go high or active causing the motors to turn on and release the parking brake. The apparatus shown in FIG. 1 thus automatically releases the parking brake of an integrated parking brake-equipped vehicle if the driver does not release the parking brake or if an integrated parking brake controller 106 fails. A relatively complex electronic parking brake system is thus made more reliable by including a "fail safe" release circuit 100 which provides a redundant apparatus by which the parking brakes in such a system can be released.

Figure 2:
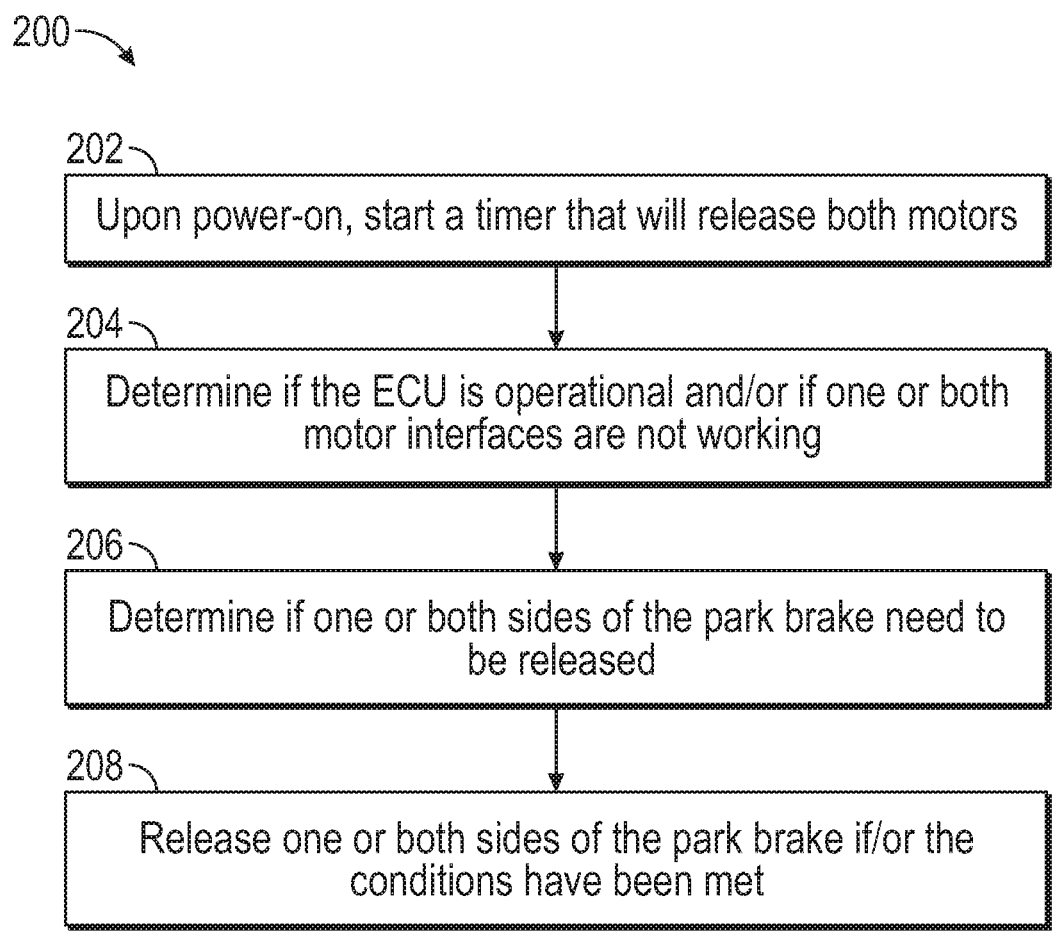
FIG. 2 is a flow chart depicting steps of a method.

Finally, FIG. 2 depicts steps of a method 200 for releasing an integrated parking brake using a redundant integrated parking brake release circuit, such as the one shown in FIG. 1.

At a first step 202, a "first" timer is started when the vehicle's ignition is actuated or the operating state of the vehicle is otherwise changed responsive to a driver's intention to move the vehicle. At the next step 204, a determination is made whether the vehicle's engine control unit or "ECU" (where the IPB controller is typically located) is operational and whether either of the motors' interfaces are inoperative, i.e., whether one or both motor interfaces are working.

At step 206, a determination is made whether one or both sides of the parking brakes need to be released. If so, at step 208, the parking brakes that need to be released, i.e., left, right or both, are released by providing the current to reverse the corresponding motor(s).

The foregoing description is for purposes of illustration only. Although an example embodiment has been disclosed, a worker of ordinary skill in this art would recognize that certain modifications would come within the scope of this disclosure. The true scope of the disclosure is set forth in the following claims.

What is claimed is:

1. An apparatus for releasing an electric motor-driven parking brake of a motor vehicle, the electric motor-driven parking brake comprising a mechanical parking brake, which is applied and released by controlling the operation and direction of an electric motor that is mechanically coupled to the mechanical parking brake, the electric motor being normally driven by a first electrical energy source, the apparatus comprising:
a processor configured to receive a parking brake power supply failure signal, which when received, it indicates to the processor that the first electrical energy source is unable to provide electrical energy to the electric motor;
an electronically controlled, normally-open switch connected between a second electrical energy source and the electric motor, the normally-open switch being operatively coupled to the processor and capable of closing and opening responsive to a control signal from the processor;
wherein, the processor is configured to send a parking brake release control signal to the electronically controlled, normally-open switch upon the processor's receipt of the parking brake power supply failure signal, the parking brake release control signal causing the electronically controlled, normally-open switch to close and thereby provide electrical energy to the motor; and
first and second timers connected in series, the first and second timers enabling and disabling the actuation of the electronically controlled, normally-open switch, wherein the first timer is started when the motor vehicle ignition is turned on and runs until the expiration of a predetermined amount of time the expiration of which is followed by a signal being sent to the second timer to begin a wait time for reset signal.

2. The apparatus of claim 1, wherein the electronically controlled, normally-open switch comprises a field effect transistor and wherein the second electrical energy source is a battery.

3. The apparatus of claim 2, wherein the processor, the motor, the electronically controlled, normally-open switch and the second electrical energy source are selected and arranged to provide electrical energy to the electric motor that will cause the electric motor to rotate in only one direction when the electric motor receives electrical energy from the second power source, the one direction causing the parking brake to release.

4. The apparatus of claim 3, further comprising an integrated parking brake controller, an output of which is connected to the electric motor, the output of the integrated parking brake controller providing a first and second output voltages, which cause the motor to apply and release the parking brake respectively.

5. The apparatus of claim 1, further comprising first and second timers connected in series, the first and second timers enabling and disabling the actuation of the electronically controlled, normally-open switch, wherein the first timer is started when the motor vehicle ignition is turned on and runs until the expiration of a predetermined amount of time the expiration of which is followed by a signal being sent to the second timer to begin a wait time for reset signal.

6. The apparatus of claim 1, wherein an output from the first timer goes active to cause the motor to turn on and release the parking brake in response to failure to receive the reset signal.

7. The apparatus of claim 1, wherein an output from the first timer goes active to cause the motor to turn on and release the parking brake in response to failure to receive the reset signal.

8. An electric motor-driven parking brake system for a motor vehicle comprising:
a mechanical parking brake coupled to an electric motor, wherein the mechanical parking brake is applied and released by controlling operation and direction of the electric motor; an electric energy source driving operation of the electric motor;
a controller controlling operation of the electric motor to release the parking brake, the controller including, a processor configured to receive a parking brake power supply failure signal, which when received, it indicates to the processor that the first electrical energy source is unable to provide electrical energy to the electric motor, an electronically controlled, normally-open switch connected between a second electrical energy source and the electric motor, the normally-open switch being operatively coupled to the processor and capable of closing and opening responsive to a control signal from the processor, wherein, the processor is configured to send a parking brake release control signal to the electronically controlled, normally-open switch upon the processor's receipt of the parking brake power supply failure signal, the parking brake release control signal causing the electronically controlled, normally-open switch to close and thereby provide electrical energy to the motor; and first and second timers connected in series, the first and second timers enabling and disabling the actuation of the electronically controlled, normally-open switch, wherein the first timer is started when the motor vehicle ignition is turned on and runs until the expiration of a predetermined amount of time the expiration of which is followed by a signal being sent to the second timer to begin a wait time for reset signal.

9. The electric motor-driven parking brake system of claim 8, wherein the electronically controlled, normally-open switch comprises a field effect transistor and wherein the second electrical energy source is a battery.

10. The electric motor-driven parking brake system of claim 9, wherein the processor, the motor, the electronically controlled, normally-open switch and the second electrical energy source are selected and arranged to provide electrical energy to the electric motor that will cause the electric motor to rotate in only one direction when the electric motor receives electrical energy from the second power source, the one direction causing the parking brake to release.

11. The electric motor-driven parking brake system of claim 10, further comprising an integrated parking brake controller, an output of which is connected to the electric motor, the output of the integrated parking brake controller providing a first and second output voltages, which cause the motor to apply and release the parking brake respectively.

12. The electric motor-driven parking brake system of claim 8, further comprising first and second timers connected in series, the first and second timers enabling and disabling the actuation of the electronically controlled, normally-open switch, wherein the first timer is started when the motor vehicle ignition is turned on and runs until the expiration of a predetermined amount of time the expiration of which is followed by a signal being sent to the second timer to begin a wait time for reset signal.

13. A method of controlling an electric motor-driven parking brake system for a motor vehicle comprising:

starting a timer in response to an action demonstrating an intention to move the motor vehicle;

determining an operational state of an engine control unit;

determining an operational state of an electric motor coupled to a parking brake; determining if the parking brake requires release; and for an apparatus, providing a current to operate the electric motor to release the parking brake, the apparatus comprises a processor configured to receive a parking brake power supply failure signal, which when received, it indicates to the processor that the first electrical energy source is unable to provide electrical energy to the electric motor;

an electronically controlled, normally-open switch connected between a second electrical energy source and the electric motor, the normally-open switch being operatively coupled to the processor and capable of closing and opening responsive to a control signal from the processor;

wherein, the processor is configured to send a parking brake release control signal to the electronically controlled, normally-open switch upon the processor's receipt of the parking brake power supply failure signal, the parking brake release control signal causing the electronically controlled, normally-open switch to close and thereby provide electrical energy to the motor; and first and second timers connected in series, the first and second timers enabling and disabling the actuation of the electronically controlled, normally-open switch, wherein the first timer is started when the motor vehicle ignition is turned on and runs until the expiration of a predetermined amount of time the expiration of which is followed by a signal being sent to the second timer to begin a wait time for reset signal.

14. The method as recited in claim 13, wherein the action demonstrating an intention to move the motor vehicle comprises actuation of an ignition of the motor vehicle.

15. The method as recited in claim 13, including the step of powering the electric motor through a release circuit responsive to the timer expiring without receiving an indication that the parking brake has been released.

* * * * *